United States Patent
Sundin et al.

(10) Patent No.: US 9,549,436 B2
(45) Date of Patent: Jan. 17, 2017

(54) RADIO BASE STATION WITH ASYMMETRIC INTERFACE BETWEEN BASEBAND UNIT AND RF UNIT

(75) Inventors: Tomas Sundin, Sollentuna (SE); Hakan Andersson, Linkoping (SE); Bo Goransson, Sollentuna (SE)

(73) Assignee: TELEFONAKTIEBOLAGET LM ERICCSON (publ), Stockholm (DE)

(*) Notice: Subject to any disclaimer, the term of this patent is extended or adjusted under 35 U.S.C. 154(b) by 131 days.

(21) Appl. No.: 14/364,987

(22) PCT Filed: Dec. 15, 2011

(86) PCT No.: PCT/EP2011/072987
§ 371 (c)(1),
(2), (4) Date: Jun. 12, 2014

(87) PCT Pub. No.: WO2013/087117
PCT Pub. Date: Jun. 20, 2013

(65) Prior Publication Data
US 2014/0328308 A1   Nov. 6, 2014

(51) Int. Cl.
*H04W 4/00* (2009.01)
*H04W 88/08* (2009.01)
*H04L 5/00* (2006.01)

(52) U.S. Cl.
CPC .............. *H04W 88/08* (2013.01); *H04L 5/003* (2013.01)

(58) Field of Classification Search
CPC ............................... H04W 88/08; H04L 5/003
See application file for complete search history.

(56) References Cited

U.S. PATENT DOCUMENTS

| 4,021,808 A | * 5/1977 | Spratt ...................... G01S 1/56 342/400 |
| 6,535,732 B1 | 3/2003 | McIntosh et al. |
| 6,771,614 B1 | * 8/2004 | Jones, IV ............. H04B 7/2612 370/310 |

(Continued)

FOREIGN PATENT DOCUMENTS

| WO | 9918744 A1 | 4/1999 |
| WO | 2009117812 A1 | 10/2009 |
| WO | 2010092166 A2 | 8/2010 |

OTHER PUBLICATIONS

OBSAI, "Open Base Station Architecture Initiative", BTS System Reference Document Version 2.0, Issue 2.0, 2006, 151 pages.

(Continued)

*Primary Examiner* — Phuc Tran
(74) *Attorney, Agent, or Firm* — Rothwell, Figg, Ernst, & Manbeck, P.C.

(57) ABSTRACT

The invention relates to an integrated antenna node (22) for use in wireless communication in a communication system (20), the wireless communication involving uplink and downlink physical-layer processing. The integrated antenna node (22) is adapted to perform, for at least one set of corresponding uplink and downlink physical-layer processing functions, only the uplink physical-layer processing functions or the corresponding downlink physical-layer processing functions. The invention further relates to a main node (21), a radio base station (28), computer programs and computer program products.

17 Claims, 6 Drawing Sheets

(56) References Cited

U.S. PATENT DOCUMENTS

| | | | | |
|---|---|---|---|---|
| 7,006,560 | B2* | 2/2006 | Kindler | H04N 5/455 348/E5.003 |
| 7,391,790 | B2* | 6/2008 | Kim | H04W 88/02 370/466 |
| 7,859,989 | B2* | 12/2010 | Kim | H04L 12/4625 370/208 |
| 9,065,519 | B2* | 6/2015 | Cyzs | H04B 1/126 |
| 2004/0081248 | A1* | 4/2004 | Parolari | H04L 1/0003 375/259 |
| 2007/0060149 | A1* | 3/2007 | Lim | H04W 28/06 455/445 |
| 2007/0105592 | A1* | 5/2007 | Kang | H04W 48/08 455/561 |
| 2007/0121939 | A1* | 5/2007 | Olesen | H04L 63/12 380/201 |
| 2009/0285316 | A1* | 11/2009 | Park | H04L 25/0202 375/260 |
| 2009/0305741 | A1* | 12/2009 | Takeuchi | H04W 52/143 455/561 |
| 2010/0316384 | A1* | 12/2010 | Sucharczuk | H04L 12/2801 398/79 |
| 2011/0044377 | A1* | 2/2011 | Ibi | H04J 11/00 375/133 |
| 2012/0014428 | A1* | 1/2012 | Park | H04L 25/0202 375/231 |
| 2012/0134449 | A1* | 5/2012 | Chen | H04L 1/0052 375/340 |
| 2013/0102254 | A1* | 4/2013 | Cyzs | H04B 1/126 455/63.1 |
| 2013/0108078 | A1* | 5/2013 | Ma | H04R 3/04 381/103 |

OTHER PUBLICATIONS

Common Public Radio Interface, "Specification" CPRI, http://www.cpri.info/spec.html, 2014, 3 pages.

Official Action issued on Mar. 13, 2015 in corresponding Mexican application No. MX/a/2014/006387, 4 pages.

\* cited by examiner

RADIO BASE STATION WITH ASYMMETRIC INTERFACE BETWEEN BASEBAND UNIT AND RF UNIT

CROSS-REFERENCE TO RELATED APPLICATION

This application is a 35 U.S.C. §371 National Phase Entry Application from PCT/EP2011/072987, filed Dec. 15, 2011, and designating the United States.

TECHNICAL FIELD

The technology disclosed herein relates generally to the field of wireless communication systems, and in particular to radio base station architectures of such wireless communication systems.

BACKGROUND

In the early days of wireless telecommunication, the radio base station architecture comprised two distinct parts: an active part comprising digital and analog components required for signal processing and a passive part comprising filters and antennas for transmitting/receiving radio-frequency (RF) signals. The link between these two parts was a high-power analog radio-frequency (RF) link. This RF feeder link often required long cables of high quality and large dimensions, which entailed high costs for keeping unavoidable signal-quality losses and power losses to a minimum.

Power amplifiers and other RF blocks have recently been integrated more closely with the physical antenna in order to avoid the above-described link and the architecture of the radio base station is changing. FIG. 1 illustrates, at the left-hand side, the traditional architecture with a base station module 1 interconnected with an antenna node 2 by means of the analog RF feeder link 3. At the right-hand side of FIG. 1, the evolution towards integrating RF functions more closely with the physical antenna is illustrated by a main node 11 interconnected with a remote radio unit 12 by means of a digital interface 13. The remote radio unit 12 is in turn connected to or comprises the physical antenna 14.

The digital interface 13 may be realized in different ways for different standards and different products depending on, e.g., bandwidth of the communication system. Examples of such digital interface comprise Common Public Radio Interface (CPRI) and Open Base Station Standard Initiative (OBSAI). Proprietary digital interfaces available on the market may also be used.

The scarce spectrum availability makes the implementation of spectral efficient telecom systems highly desirable. Spectral efficiency is achieved in many different ways but recently two main directions that are if interest here can be noted. One is towards adding more antennas at each node (more antennas per radio unit or more radio units per site) making it possible to utilize MIMO or beam-forming capabilities. The other trend is to use more centralized processing in terms of data-link-layer (Layer 2) scheduling for DL and UL but also in terms of joint physical-layer processing of data from several sites. Both the addition of antennas and the requirement of centralized processing lead to higher bandwidth requirements on the digital interface between the main unit and the radio unit(s). The implementation of high-bandwidth digital interfaces is difficult technically as well as costly, and it is therefore desirable to keep the bandwidth requirements on the digital interface to a minimum.

SUMMARY

An object of the invention is to address and at least mitigate the above-mentioned problem. In particular, it is an object of the invention to enable reduction of the required capacity of the digital interface between a main node and a remote radio node.

The object is according to a first aspect achieved by an integrated antenna node for use in wireless communication in a communication system. The wireless communication involves uplink and downlink physical-layer processing, and the integrated antenna node is adapted to perform, for at least one set of corresponding uplink and downlink physical-layer processing functions, only the uplink physical-layer processing functions or the corresponding downlink physical-layer processing functions.

By integrating e.g. some of the downlink physical-layer processing functions, and not all of the corresponding uplink physical-layer processing functions, an asymmetry is constructed that leads to a substantially lower bandwidth requirement on the digital interface for the downlink while still allowing for centralized processing in a main node of the uplink. The reduced capacity need of the digital interface gives large cost reductions, and the maintained centralized processing of the uplink gives high spectral efficiency.

The object is according to a second aspect achieved by a method performed in an integrated antenna node for use in wireless communication in a communication system. The wireless communication involves uplink and downlink physical-layer processing. The method comprises performing, for at least one set of corresponding uplink and downlink physical-layer processing functions, only the uplink physical-layer processing functions or the corresponding downlink physical-layer processing functions.

The object is according to a third aspect achieved by a computer program for an integrated antenna node for use in wireless communication in a communication system. The wireless communication involves uplink and downlink physical-layer processing. The computer program comprises computer program code which, when run on the integrated antenna node, causes the integrated antenna node to perform, for at least one set of corresponding uplink and downlink physical-layer processing functions, only the uplink physical-layer processing functions or the corresponding downlink physical-layer processing functions.

The object is according to a fourth aspect achieved by a computer program product comprising a computer program as above and a computer readable means on which the computer program is stored.

The object is according to a fifth aspect achieved by a main node for use in a wireless communication system. The wireless communication involves uplink and downlink physical-layer processing. The main node is adapted to perform, for at least one set of corresponding uplink and downlink physical-layer processing functions, only the uplink physical-layer processing functions or the corresponding downlink physical-layer processing functions.

The object is according to a sixth aspect achieved by a method performed in a main node for use in a wireless communication system. The wireless communication involves uplink and downlink physical-layer processing. The method comprises performing, for at least one set of corresponding uplink and downlink data link-layer processing functions, only the uplink data link-layer processing functions or the corresponding downlink data link-layer processing functions.

The object is according to a seventh aspect achieved by a computer program for a main node (for use in a wireless communication system. The wireless communication involves uplink and downlink physical-layer processing. The computer program comprises computer program code which, when run on the main node, causes the main node to perform, for at least one set of corresponding uplink and downlink data link-layer processing functions, only the uplink data link-layer processing functions or the corresponding downlink data link-layer processing functions.

The object is according to a eighth aspect achieved by a computer program product comprising a computer program as above and a computer readable means on which the computer program is stored.

The object is according to a ninth aspect achieved by a radio base station for wireless communication in a communication system. The wireless communication involves uplink and downlink physical-layer processing. The radio base station comprises an integrated antenna node and a main node arranged to exchange data by means of an asymmetric digital interface. The integrated antenna node and the main node are, respectively, arranged to perform, for at least one set of corresponding uplink and downlink data link-layer processing functions, only the uplink data link-layer processing functions or the corresponding downlink data link-layer processing functions.

The object is according to a tenth aspect achieved by a method performed in a radio base station for wireless communication in a communication system. The wireless communication involves uplink and downlink physical-layer processing. The radio base station comprises an integrated antenna node and a main node exchanging data by means of an asymmetric digital interface. The method comprises performing in the integrated antenna node and the main node, respectively, for at least one set of corresponding uplink and downlink data link-layer processing functions, only the uplink data link-layer processing functions or the corresponding downlink data link-layer processing functions.

Further features and advantages of the invention will become clear upon reading the following description and the accompanying drawings.

DETAILED DESCRIPTION OF EMBODIMENTS

Figure 1:
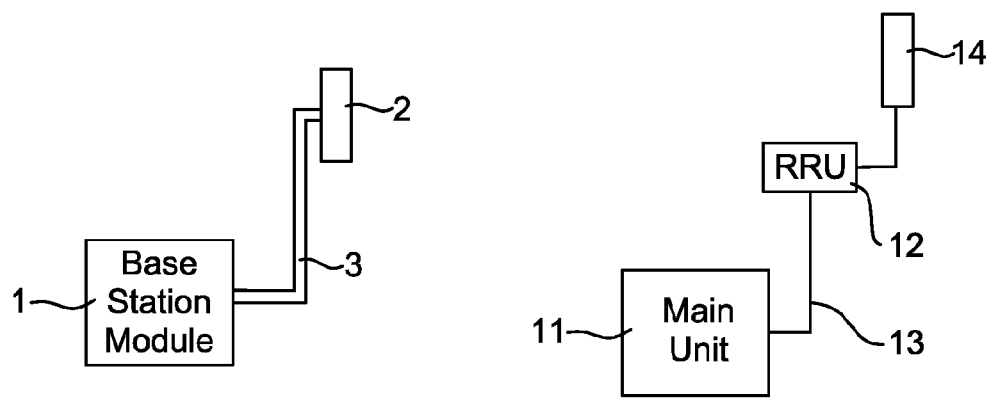
FIG. 1 illustrates two known radio base station architectures.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
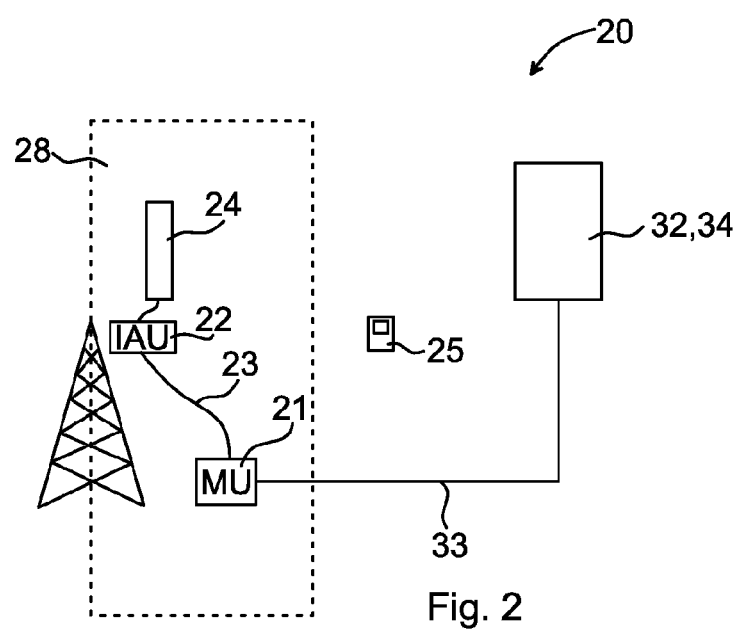
FIG. 2 illustrates schematically an environment in which embodiments of the invention may be implemented.

FIG. 2 illustrates schematically an environment in which embodiments of the invention may be implemented. A communication system 20 comprises one or more radio base stations 28. The radio base station 28 is arranged to communicate wirelessly with one or more user equipment 25 using radio frequency transmitter(s) and receiver(s), for example utilizing multiple-input multiple-output (MIMO) antenna technology. A radio base station is denoted differently in different communication systems, e.g. denoted evolved Node B or eNB in communication systems conforming to Long Term Evolution (LTE) standards. It is noted that the invention is not restricted to any particular standard, and the communication system 20 may implement any standard such as e.g. LTE, Wideband Code-Division Multiple Access (WCDMA), Code-Division Multiple Access 2000 (CDMA2000), Global System for Mobile Communications (GSM) or Worldwide Interoperability for Microwave Access (WiMAX).

The communication in the communication system 20 is wireless communication, which involves uplink and downlink signal processing in various layer levels. In particular, the wireless communication comprises uplink and downlink physical-layer processing (also denoted layer one processing) and also higher level layer processing, such as data link-layer processing (also denoted layer two processing) and control-layer processing.

The radio base station 28 comprises a main node 21, in the following also denoted main unit, and an integrated antenna node 22, in the following also denoted integrated antenna unit. The main node 21 and the integrated antenna node 22 are arranged to exchange data by means of an asymmetric digital interface 23.

The integrated antenna node 22 comprises or is connected to a physical antenna 24 transmitting and receiving signaling to/from the user equipment 25. That is, the physical antenna may be integrated with the integrated antenna node or the physical antenna 24 may be a separate part connected to the integrated antenna node 22.

The main node 21 may be connected to further integrated antenna units 32 (here illustrated as integrated with the physical antenna 34), exchanging data over an asymmetric digital interface 33.

Conventionally, the allocation of functionality between the integrated antenna unit 22 and the main node 21 is symmetrical between the downlink (DL) and the uplink (UL), making the required bandwidth the same or at least similar in both directions. This is illustrated in FIG. 3.

Figure 3:
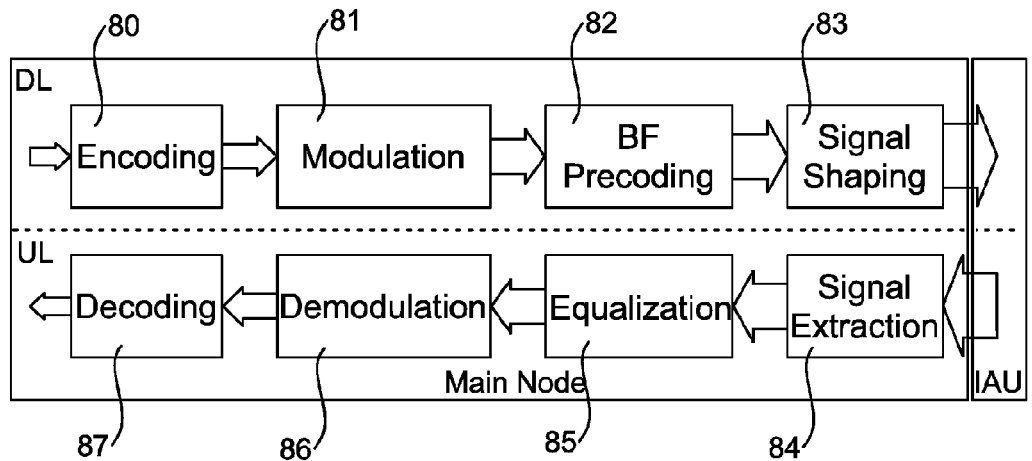
FIG. 3 illustrates a generalized flowchart of physical-layer of a communication system.

In particular, FIG. 3 illustrates a simplified generalized flowchart of a physical layer of the communication system 20.

The top half shows some basic processing blocks for the downlink and the bottom half shows some corresponding processing blocks for the uplink. The physical layer thus comprises downlink and uplink physical-layer processing, exemplified by different physical-layer processing functions: encoding 80/decoding, modulation 81/demodulation 86, beamforming, precoding 82/equalization 85, signal shaping 83/signal extraction 84.

The width of the arrows in-between the blocks signifies the relative bandwidth requirements for data between the blocks. It can be seen that the bandwidth requirement increases further and further down the downlink processing chain, while it decreases further and further along the uplink processing chain.

The bandwidth difference arises from, inter alia: redundancy for error protection, multiplexing of data with physical-layer generated control signaling as well as physical signals used for synchronization and measurements, change of numerical representation from bits to (complex-) valued integers represented by several bits (i.e., modulation), multi-antenna processing where symbols are mapped to one or several antennas, etc. FIG. 3 illustrates the split between the main node and the integrated antenna node as it is traditionally done. As explained earlier, this split results in a high bandwidth requirement between the main node and the integrated antenna node for both downlink and uplink and a low level of integration of physical-layer digital-processing units into the integrated antenna node.

It is noted that only the physical-layer processing for the main node and the integrated antenna node is illustrated in FIG. 3. Although not illustrated, the integrated antenna node comprises radio implementation blocks such as channelization and RF-processing (refer also to FIG. 8). Likewise, although not illustrated, the main node comprises data-link layer blocks such as, e.g., radio-link control processing (refer also to FIG. 8).

In contrast to the above, the present invention provides, in various aspects, an asymmetric functionality split with respect to the downlink and the uplink, between the main node 21 and the integrated antenna node 22. This is realized by integrating many (or some) of the downlink processing functions into the integrated antenna node 22 but keeping most (or all) of the uplink processing functions in the main unit 21. This asymmetry leads to a substantially lower bandwidth requirement on the digital interface 23 for the downlink while still allowing for centralized processing of the uplink, where it is beneficial in order to accomplish high spectral efficiency.

Figure 4:
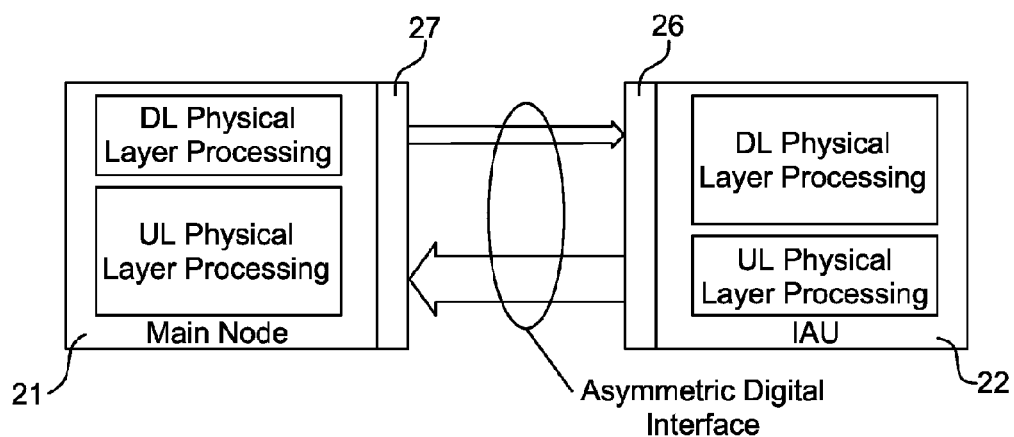
FIG. 4 illustrates a general functional allocation of physical-layer processing in accordance with aspects of the invention.

FIG. 4 illustrates schematically this asymmetrical functionality split. In the illustrated example, the main node 21 comprises more uplink physical-layer processing functions than the integrated antenna node 22, and fewer downlink physical-layer processing function than the integrated antenna node 22. These differences are illustrated by the size of the respective boxes. The asymmetrical functionality split then gives different bandwidth requirements in uplink and downlink, respectively, which is illustrated by the size of the arrows between the nodes 21, 22.

In the following some aspects are given on how to split the functionality between the integrated antenna node 22 and the main node 21.

To couple the same main node 21 to several integrated antenna nodes 22 enables a more advanced processing in the uplink using data from several antennas, which meets the requirements for increased spectral efficiency. When implementing the present invention, it is noted that the processing blocks in the uplink are expected to be flexible and the coupling between the implemented standard such as, e.g., LTE, WCDMA, or WiMax and the choice of algorithms and/or implementation strategies is rather flexible.

In the downlink, the processing blocks are more tightly coupled to the implemented standard and therefore there is a reduced need for flexibility in these blocks. Moreover, the downlink processing blocks may be realized in accelerator blocks or by highly dedicated functions in general-purpose processors. This facilitates the integration of these blocks into the integrated antenna node 22.

That is, the integrated antenna node(s) 22 may be configured once with the desired uplink/downlink processing blocks, while the flexibility in the main node 21 provides the advantage of being able to update configurations at only one place per several integrated antenna nodes 22.

Thus, localization of the uplink processing blocks in the main node 21 instead of integrating them into each of the integrated antenna nodes 22 is advantageous. It is also noted that, in various embodiments, the spectral efficiency effecting the downlink processing is related to higher-layer functionality, such as scheduling or radio-resource management (RRM), which has limited impact on the physical-layer downlink blocks. This in turn again favors the integration of downlink physical-layer processing in the integrated antenna node 22.

The integration of several of the downlink processing blocks into the integrated antenna node 22, but keeping many (or all) of the uplink processing blocks in the main node 21 reduces the bandwidth requirement in the downlink interface between the main unit 21 and the integrated antenna nodes 22, while keeping the flexibility needed for the potentially centralized uplink processing. Aspects of the invention can be realized in several ways, and a few examples are given in the following.

In the following FIGS. 5, 6 and 7, only the physical-layer processing for the main node 21 and the integrated antenna node 22 is illustrated. Although not illustrated, the integrated antenna node 22 comprises radio implementation blocks such as channelization and RF-processing (refer also to FIG. 8). Likewise, although not illustrated, the main node comprises data-link layer blocks such as, e.g., radio-link control processing (refer also to FIG. 8).

Figure 5:
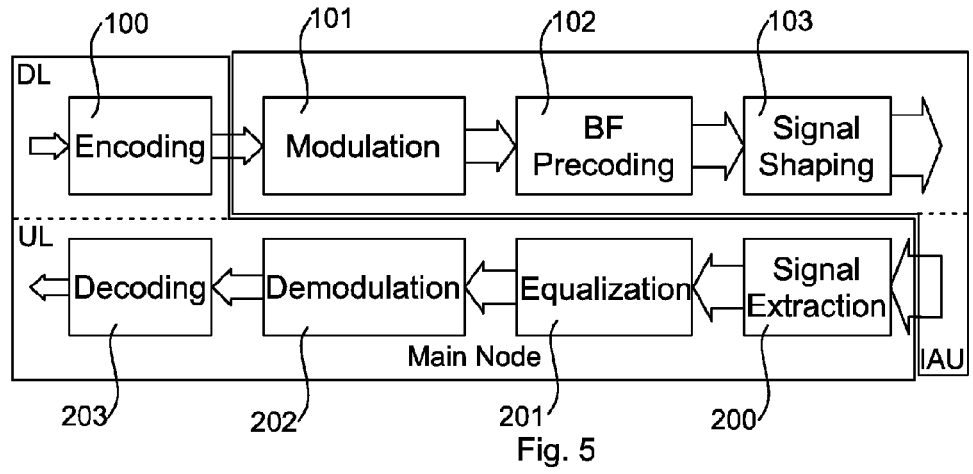
FIG. 5 illustrates a first example of the asymmetric functional split.

FIG. 5 illustrates a first example of the asymmetric functional split between the main unit 21 and integrated antenna node 22, i.e., the partition of physical-layer processing blocks between the nodes 21, 22. The downlink processing blocks are exemplified by modulation 101, beamforming/precoding 102, and signal shaping 103, which blocks are integrated into the integrated antenna node 22. This results in a large reduction in bandwidth requirement for the downlink. The uplink is left with the traditional split between the main unit 21 and the integrated antenna node 22. That is, the uplink processing blocks, exemplified as comprising signal extraction 200, equalization 201, demodulation 202, decoding 203, are integrated into the main unit 21 along with an encoding processing block 100 for the downlink.

As mentioned earlier, the wireless communication involves uplink and downlink physical-layer processing, and all processing blocks exemplified above are related to such physical-layer processing (layer one).

It is, however, noted that the functional split can be performed at higher levels also, e.g. data link-layer processing (layer two).

In this regard it is also noted that the uplink and downlink physical-layer processing functions, may be seen as comprising sets of corresponding uplink and downlink physical-layer processing functions. For example, one such set of corresponding uplink and downlink physical-layer processing functions could comprise demodulation 202 and modulation 101, and another such set could comprise equalization 201 and beamforming/precoding 102. Sometimes the corresponding uplink and downlink physical-layer processing functions, or sub-functions thereof, are reverse or even inverse functions of each other, e.g. Fast Fourier Transform (FFT)/Inverse Fast Fourier Transform (IFFT).

For different standards, the different sets of corresponding uplink and downlink physical-layer processing functions comprise different sub-functions. For example, in LTE, which uses the radio-access technologies Orthogonal Frequency-Division Multiplexing (OFDM) in the downlink and Single-Carrier-Frequency Domain Multiple Access (SC-FDMA) in the uplink, the set of corresponding processing functions comprising signal shaping/signal extraction comprises IFFT/FFT and cyclic prefix insertion/removal. That is, the downlink physical-layer processing function "signal shaping" comprises the sub-functions IFFT and cyclic prefix insertion and the corresponding uplink physical-layer processing function, i.e. the signal extraction, comprises FFT and cyclic prefix removal. As another example, in WCDMA/CDMA/Time-Division Synchronous Code-Division Multiple Access (TD-SCDMA), which all use the radio-access technology CDMA, signal shaping/signal extraction comprises Spreading/Despreading.

It is also noted that in other instances, the number of sub-functions performed in an uplink physical-layer processing function may differ from the number of corresponding downlink physical-layer processing functions.

Equalization may comprise channel estimation and signal equalization, performed by different methods such as e.g. RAKE, G-RAKE, maximal-ratio combining (MRC), Interference-Rejection Combining (IRC), Minimum Mean-Squared Error (MMSE), joint detection (JD), Successive Interference Cancellation (SIC), Parallel Interference Cancellation (PIC), or Maximum Likelihood (ML).

The expression "set of corresponding uplink and downlink physical-layer processing functions" should thus be interpreted as including all such different variations.

Figure 6:
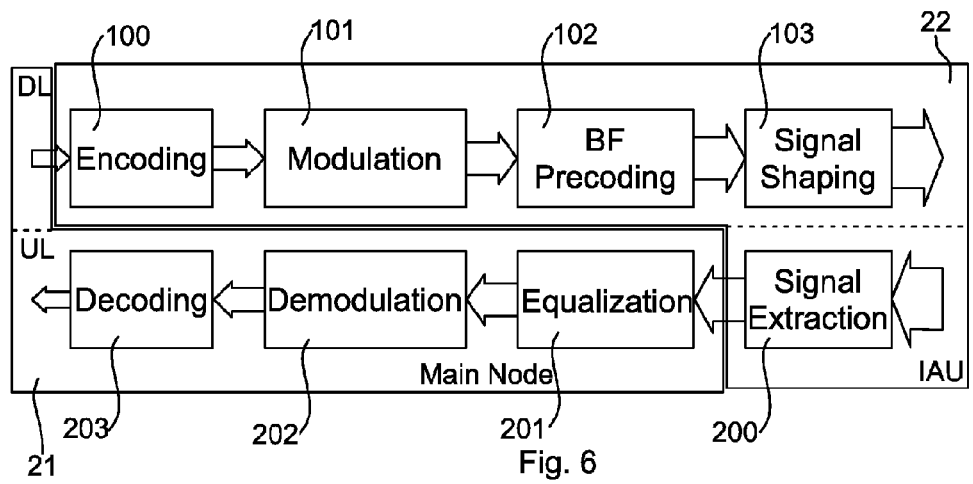
FIG. 6 illustrates a second example of the asymmetric functional split.

FIG. 6 illustrates a second example of the asymmetric functional split, i.e., the partition of physical-layer processing blocks between the main node 21 and the integrated antenna node 22. In this embodiment, the downlink encoding block 100 is also integrated into the integrated antenna node 22, further reducing the required bandwidth. Here the uplink signal extraction block 200 is also integrated into the integrated antenna node 22, reducing the bandwidth requirement on the uplink interface somewhat as well.

Figure 7:
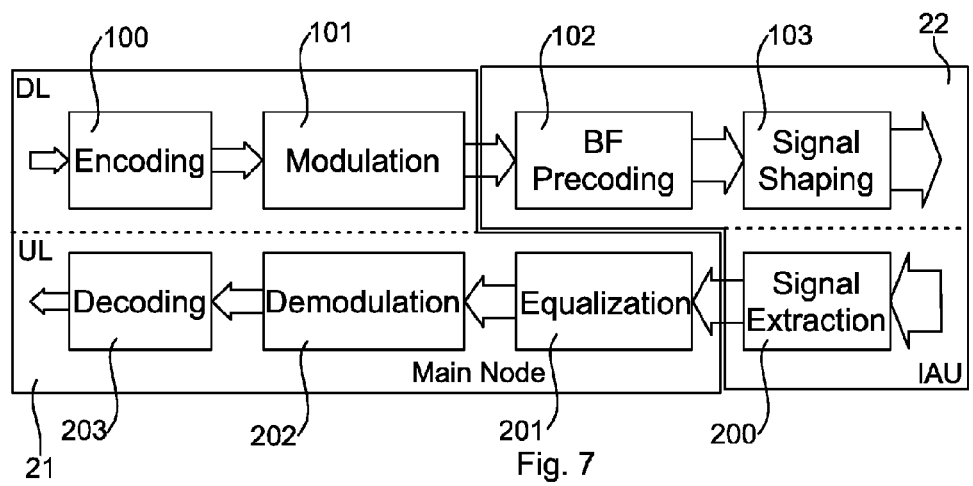
FIG. 7 illustrates a third example of the asymmetric functional split.

FIG. 7 illustrates a third example of the asymmetric functional split, i.e., the partition of physical-layer processing blocks between the main node 21 and the integrated antenna node 22. In this embodiment, all multi-antenna related processing, such as beamforming/precoding 102, is performed in the integrated antenna node 22, while bit and symbol processing 100, 101, 201, 202, 203 are still done in the main node 21.

From the above it is realized that the functional split can be implemented and varied in different ways. Some aspects of the choice of how to do the functional split have already been given. Further, the functional split is dependent on, e.g., the communication system for which this is implemented, but also on implementation aspects such as available processing blocks, cross-signaling and synchronization between downlink and uplink processing blocks, available digital interfaces, etc.

The asymmetric functionality split, with respect to uplink and downlink, between the main node 21 and the integrated antenna node 22 is also beneficial for system flexibility. Each integrated antenna node 22 can be adapted to support an increasing number of antennas without necessarily affecting the main node 21. In much the same way, a main node 21 can be adapted to support several integrated antenna nodes 22 without affecting the internal functionality of the integrated antenna node 22 if carefully choosing the functionality split between them.

As a particular example an LTE system of Release 10 (or later) is used. On downlink it supports up to two transport blocks (data streams) and up to 8 transmit (Tx) antenna ports. With a main node 21/integrated antenna node 22 split according to FIG. 7, the processing of the transport blocks in the main node 21 is independent of the number of antenna ports supported in the integrated antenna node 22. The antenna port-related processing in the integrated antenna node 22, e.g., the beamforming/precoding and the signal shaping, must be adapted to the actual number of antenna ports in use.

For the above example, in the event of Coordinated Multi-Point (DL CoMP) transmission, the main node 21/integrated antenna node 22 split can be located after the modulation block 101, and the modulated data streams are distributed to several geographically separated integrated antenna nodes 22 with further processing adapted for CoMP. Hence, one main unit 21 supports several integrated antenna nodes 22.

On uplink, joint processing of data from several antenna sites can be used. Hence, multiple integrated antenna nodes 22 feed data to a single main unit 21. In this case the main node 21/integrated antenna node 22 split depends on the receiver/decoding algorithms used. For ML decoding or SIC processing, the unprocessed antenna samples are needed in the main node 21, which limits the integrated antenna node 22 processing to signal extraction. When using simpler signal-combining schemes in the main node 21, more receiver processing can be performed in each integrated antenna node 22, thus reducing the bandwidth requirement between the integrated antenna nodes 22 and the main node 21 at the expense of overall receiver performance.

One example of typical interface savings is presented next. Note that this should serve only as an example and the numbers used may not exactly match those in a real system. Nevertheless, this is indicative of the potential gain that can be achieved by using the architecture disclosed herein.

Assume an LTE system with four transmit antennas and 20 MHz channel band-width. The downlink peak rate of such a system would be in the order of 300 Mbps (2×149 776 bits can be transmitted each subframe of 1 ms). If the split depicted in FIG. 6 is used, the capacity of the digital interface would be of this order. Some overhead can be expected, but the order of magnitude would at least be correct.

For comparison, with a traditional split between main unit 21 and integrated antenna node 22 an order of magnitude higher capacity would be needed. In this case the data bits would be encoded, modulated, precoded, and then OFDM processed. A typical sampling frequency for such a system would be approximately 30 Msample/s, and if each sample is represented with 30 bits, a total of 30×30×4=3600 Mbps need to be transmitted between the main node 21 and integrated antenna node 22 for downlink data of one cell only.

Figure 8:
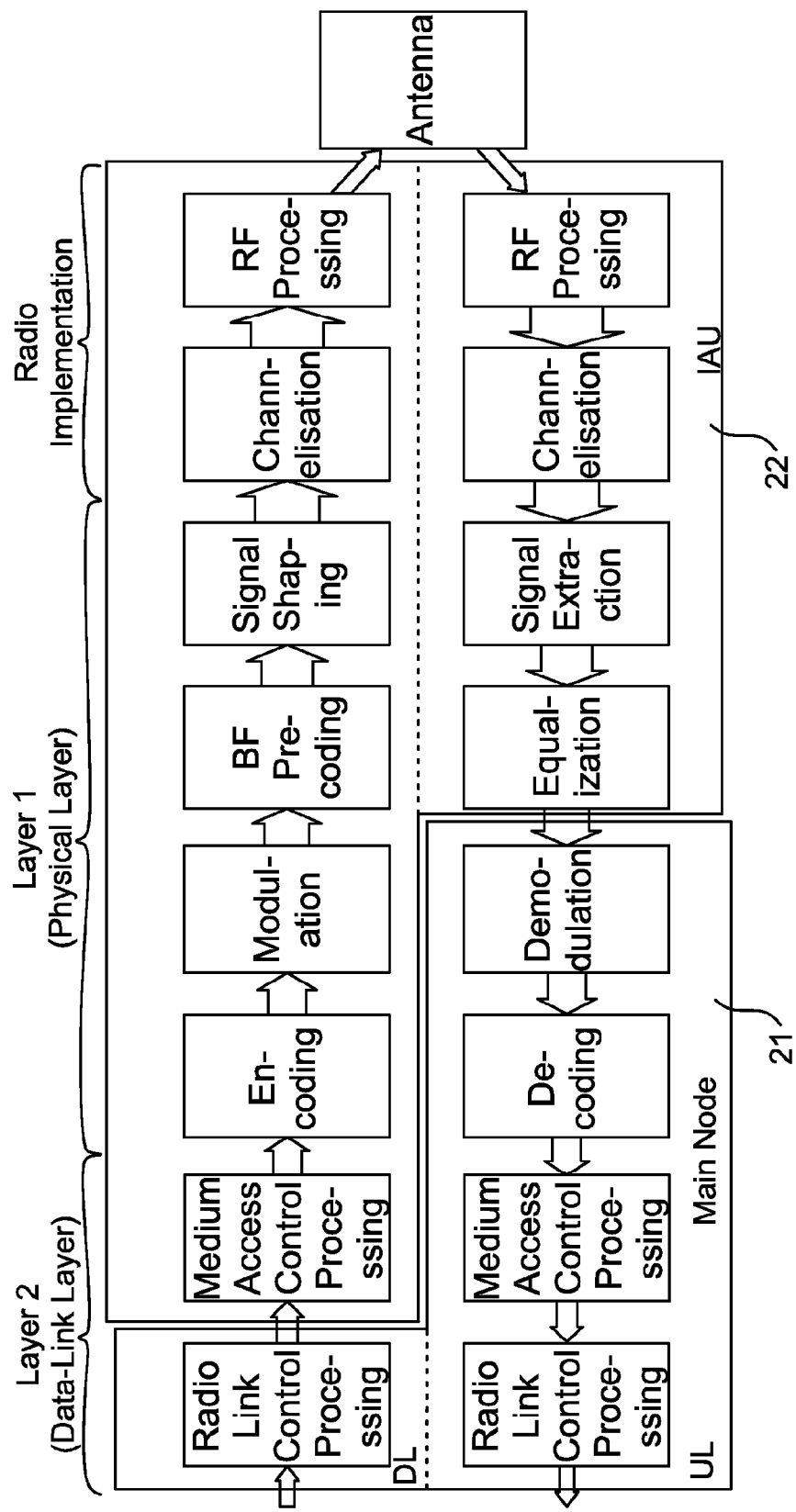
FIG. 8 illustrates a fourth example of the asymmetric functional split.

FIG. 8 illustrates a fourth example of the asymmetric functional split. Above, the functional split has been exemplified for the physical layer only (layer one), but as mentioned, the functional split can be performed at higher levels also, e.g. data link-layer processing (layer two), which is illustrated in FIG. 8. In particular, the asymmetric functional split, with respect to uplink and downlink, between the main node 21 and the integrated antenna node 22 is shown. In the illustrated example, data link-layer (layer 2) processing functions are integrated into the integrated antenna node 22, in particular the data link-layer processing functions medium-access control processing for downlink.

Figure 9:
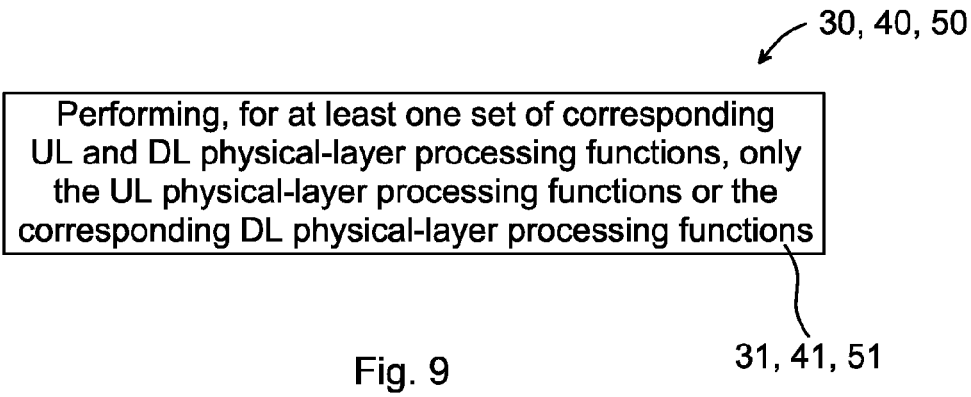
FIG. 9 illustrates a flow chart over methods performed in the different nodes.

FIG. 9 illustrates a flow chart of methods performed in the different nodes 21, 22, 28 of the communication system 20.

In an aspect, a method 30 performed in the integrated antenna node 22 for use in wireless communication in the communication system 20 is provided. The wireless communication involves, as described, uplink and downlink physical-layer processing. The method 30 comprises performing 31, for at least one set of corresponding uplink and downlink physical-layer processing functions, only the uplink physical-layer processing functions or the corresponding downlink physical-layer processing functions.

In another aspect, and still with reference to FIG. 9, a method 40 performed in the main node 21 for use in a wireless communication system 20 is provided. The wireless communication involves uplink and downlink physical-layer processing. The method 40 comprises performing 41, for at least one set of corresponding uplink and downlink data link-layer processing functions, only the uplink data link-layer processing functions or the corresponding downlink data link-layer processing functions.

In still another aspect, again with reference to FIG. 9, a method 50 performed in a radio base station 28 for wireless communication in a communication system 20 is provided. The wireless communication involves uplink and downlink physical-layer processing, and the radio base station 28 comprises an integrated antenna node 22 and a main node 21 exchanging data by means of an asymmetric digital interface 23. The method 50 comprises performing 51 in the integrated antenna node 22 and the main node 21, respectively, for at least one set of corresponding uplink and downlink data link-layer processing functions, only the uplink data link-layer processing functions or the corresponding downlink data link-layer processing functions.

Figure 10:
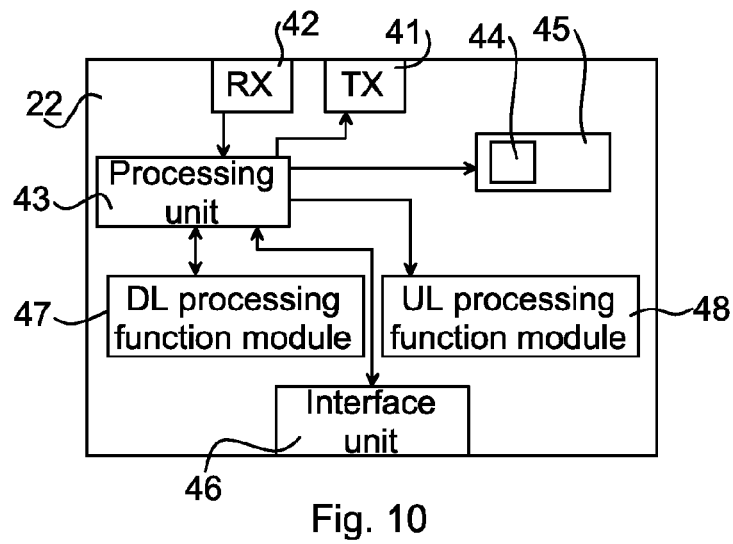
FIG. 10 illustrates an exemplifying integrated antenna node comprising means for implementing embodiments of various aspects of the invention.

FIG. 10 illustrates an exemplifying integrated antenna node comprising means for implementing embodiments of various aspects of the invention. The integrated antenna node 22 is suitable for use in wireless communication in the communication system 20 as described. The wireless communication involves uplink and downlink physical-layer processing, and the integrated antenna node 22 is adapted to perform, for at least one set of corresponding uplink and downlink physical-layer processing functions, only the uplink physical-layer processing functions or the corresponding downlink physical-layer processing functions.

In an embodiment, the integrated antenna node 22 is adapted to perform all downlink physical-layer processing functions performed in the communication system 20.

In an embodiment, the uplink physical-layer processing functions 200, 201, 202, 203 comprise one or more of: signal extraction 200, equalization 201, demodulation 202, decoding 203, medium-access control processing, and radio link control processing.

In an embodiment, the downlink physical-layer processing functions 100, 101, 102, 103 comprise one or more of: encoding 100, modulation 101, beam-forming and pre-coding 102, signal shaping 103, medium-access control processing, and radio-link control processing.

In an embodiment, the integrated antenna node 22 comprises an asymmetrical digital interface 23 for exchanging data with the main node 21 also adapted to perform uplink and downlink physical-layer processing functions in the wireless communication system 20.

In an embodiment, the wireless communication further involves uplink and downlink data link-layer processing, the integrated antenna node 22 is then adapted to perform, for at least one set of corresponding uplink and downlink data link-layer processing functions, only the uplink data link-layer processing functions or the corresponding downlink data link-layer processing functions.

In particular, the integrated antenna node 22 comprises a number of downlink processing function modules 47, the number being at least one such module. The number of and which downlink processing function modules 47 to include have been exemplified thoroughly earlier.

The integrated antenna node 22 may further comprise a number of uplink processing function modules 48. In one embodiment, the integrated antenna node 22 comprises none of such uplink processing function module 48, i.e., all uplink processing is performed in the main node 21. The number of and which uplink processing function modules 47 to include have been exemplified thoroughly earlier.

The integrated antenna node 22 further comprises a processing unit 43. It is noted that although the processing unit 43 is illustrated as a single unit, it may not only be a single processing unit, but could comprise two or more processing units. The processing unit 43 may for example comprise general purpose microprocessors, reduced instruction-set processors and/or related chips sets and/or special purpose microprocessors, such as ASICs (application-specific integrated circuits), or Field-Programmable Gate Arrays (FPGA). The processing unit 43 may also comprise board memory for caching purposes.

The processing unit 42 is operatively connected to the downlink processing function modules 47 and the uplink processing function modules 48, and configured to enable the functions of the integrated antenna node 22.

The integrated antenna node 22 may also comprise receiver circuitry 42 and transmitter circuitry 43 for signal reception and transmission by means of the physical antenna (s) 24.

It is noted that the uplink and downlink processing function modules 48, 47 (e.g. modules for physical-layer processing functions and the data link-layer processing functions) may be implemented in hardware, software, firmware or any combination thereof.

The physical-layer processing functions and the data link-layer processing functions may be implemented as program modules of a computer program 44 comprising code means which when run by the processing unit 43 in the integrated antenna node 22 causes the integrated antenna node 22 to perform the above-described functions and actions. The computer program 44 may be carried by a computer program product 45 in the integrated antenna node 22 connected to the processing unit 43. The computer program product 45 comprises a computer readable medium on which the computer program 44 is stored. For example, the computer program product 45 may be a flash memory, a RAM (Random-access memory), ROM (Read-Only memory) or an EEPROM (Electrically Erasable Programmable ROM), and the computer program modules described above could in alternative embodiments be distributed on different computer program products in the form of memories within the integrated antenna node 22. The computer program product 45 may for example be an optical disc, such as a CD (compact disc) or a DVD (digital versatile disc) or a Blu-Ray disc.

Still with reference to FIG. 10, the invention also encompasses the computer program 44 for the integrated antenna node 22 as described for wireless communication as also described. The computer program 44 comprises computer program code which, when run on the integrated antenna node 22, causes the integrated antenna node 22 to perform, for at least one set of corresponding uplink and downlink physical-layer processing functions, only the uplink physical-layer processing functions or the corresponding downlink physical-layer processing functions.

Still with reference to FIG. 10, the invention also encompasses a computer program product 45 comprising a computer program 44 as described above, and a computer readable means on which the computer program 44 is stored.

The integrated antenna node 22 further comprises an interface unit 46 implementing and enabling asymmetric communication with the main node 21 over the asymmetric digital interface 23 used for exchanging data between the nodes 21, 22. The interface unit 46 may for example comprise an input/output system and an associated protocol.

Figure 11:
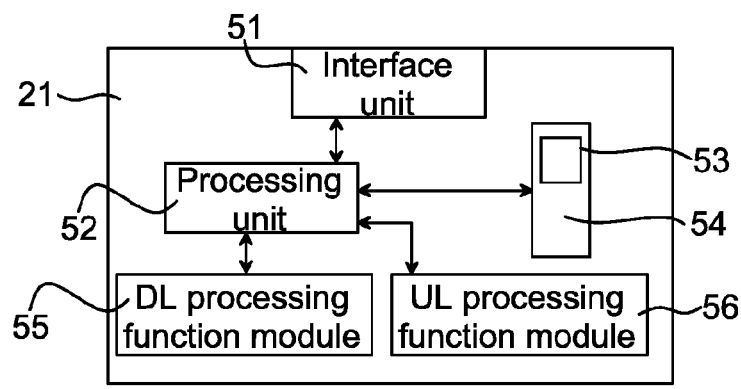
FIG. 11 illustrates an exemplifying main node comprising means for implementing embodiments of various aspects of the invention.

FIG. 11 illustrates an exemplifying main node comprising means for implementing embodiments of various aspects of the invention. The main node 21 for use in a wireless communication system 20, wherein the wireless communication involves uplink and downlink physical-layer processing. The main node 21 is adapted to perform, for at least one set of corresponding uplink and downlink physical-layer processing functions, only the uplink physical-layer processing functions or the corresponding downlink physical-layer processing functions.

In an embodiment, the main node 21 is arranged to perform all uplink physical-layer processing functions performed in the communication system 20.

In an embodiment, the uplink physical-layer processing functions 200, 201, 202, 203 comprise one or more of: signal extraction 200, equalization 201, demodulation 202, decoding 203, medium-access control processing, and radio link control processing.

In an embodiment, the downlink physical-layer processing functions 100, 101, 102, 103 comprise one or more of: encoding 100, modulation 101, beam-forming and pre-coding 102, signal shaping 103, medium-access control processing, and radio link control processing.

In an embodiment, the main node 21 further comprises an asymmetric digital interface 23 for exchanging data with an integrated antenna node 22 which is also adapted to perform uplink and downlink physical-layer processing functions in the wireless communication system 20.

In an embodiment, the wireless communication further involves uplink and downlink data link-layer processing, and the main node 21 is then further adapted to perform, for at least one set of corresponding uplink and downlink data link-layer processing functions, only the uplink data link-layer processing functions or the corresponding downlink data link-layer processing functions.

In particular, the main node 21 comprises a number of downlink processing function modules 55. In one embodiment, the main node 21 comprises none of such downlink processing function module 55, i.e. all downlink processing is performed in the integrated antenna node 22. The number of and which downlink processing function modules 47 to include have been exemplified thoroughly earlier.

The main node 21 comprises a number of uplink processing function modules 56, the number being at least one such module. The number of and which uplink processing function modules 47 to include have been exemplified thoroughly earlier.

The main node 21 further comprises a processing unit 52. It is noted that although the processing unit 52 is illustrated as a single unit, it may not only be a single processing unit, but could comprise two or more processing units. The processing unit 52 may for example comprise general purpose microprocessors, reduced instruction set processors and/or related chips sets and/or special purpose microprocessors, such as ASICs (application-specific integrated circuits), or Field-Programmable Gate Array (FPGA). The processing unit 52 may also comprise board memory for caching purposes.

The processing unit 52 is operatively connected to the downlink processing function modules 55 and the uplink processing function modules 56, and configured to enable the functions of the main node 21.

It is noted that the uplink and downlink processing function modules 55, 56 (e.g. modules for physical-layer processing functions and the data link-layer processing functions) may be implemented in hardware, software, firmware or any combination thereof.

The physical-layer processing functions and the data link-layer processing functions may be implemented as program modules of a computer program 53 comprising code means which when run by the processing unit 52 in the main node 21 causes the main node 21 to perform the above-described functions and actions. The computer program 53 may be carried by a computer program product 54 in the main node 21 connected to the processing unit 52. The computer program product 54 comprises a computer readable medium on which the computer program 53 is stored. For example, the computer program product 54 may be a flash memory, a RAM (Random-access memory), ROM (Read-Only memory) or an EEPROM (Electrically Erasable Programmable ROM), and the computer program modules described above could in alternative embodiments be distributed on different computer program products in the form of memories within the main node 21. The computer program product 54 may for example be an optical disc, such as a CD (compact disc) or a DVD (digital versatile disc) or a Blu-Ray disc.

Still with reference to FIG. 11, the invention also encompasses computer program 53 for the main node 21 as described for wireless communication as also described. The computer program 53 comprises computer program code which, when run on the main node 21, causes the main node 21 to perform, for at least one set of corresponding uplink and downlink physical-layer processing functions, only the uplink physical-layer processing functions or the corresponding downlink physical-layer processing functions.

Still with reference to FIG. 11, the invention also encompasses a computer program product 54 comprising a computer program 53 as described above, and a computer readable means on which the computer program 53 is stored.

The main node 21 further comprises an interface unit 51 implementing and enabling asymmetric communication with the integrated antenna node 22 over the asymmetric digital interface 23 used for exchanging data between the nodes 21, 22. The interface unit 51 may for example comprise an input/output system and an associated protocol.

Figure 12:
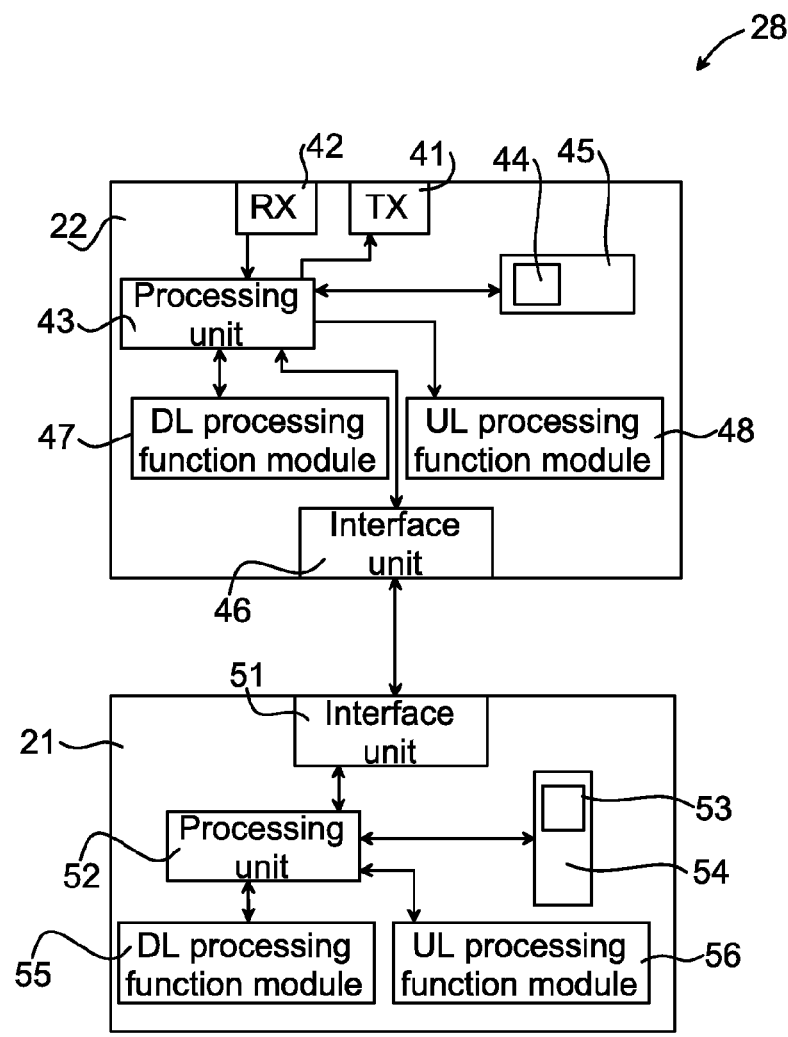
FIG. 12 illustrates an exemplifying radio base station comprising means for implementing embodiments of various aspects of the invention.

FIG. 12 illustrates an exemplifying radio base station comprising means for implementing embodiments of various aspects of the invention. The radio base station 28 is used for wireless communication in the communication system 20 as described, wherein the wireless communication involves uplink and downlink physical-layer processing. The radio base station 28 comprise the integrated antenna node 22 and the main node 21 which are arranged to exchange data by means of the asymmetric digital interface 23. The integrated antenna node 22 and the main node 21, respectively, are arranged to perform, for at least one set of corresponding uplink and downlink data link-layer processing functions, only the uplink data link-layer processing functions or the corresponding downlink data link-layer processing functions.

In particular, the radio base station comprises the integrated antenna node 22 as described with reference to FIG. 10 and the main node 21 as described with reference to FIG. 11. The radio base station 28 also comprises the asymmetric digital interface 23, by means of which the main node 21 and the integrated antenna node 22 exchanges data. The asymmetric digital interface 23 may comprise a synchronous asymmetric interface or an asynchronous asymmetric interface.

The invention claimed is:

1. An integrated antenna node (IAN) for use in wireless communication in a communication system, the wireless communication involving a set of one or more uplink (UL) physical layer processing functions and a corresponding set of one or more DL physical layer processing functions, wherein each DL physical layer processing function included in the corresponding set of DL physical layer processing functions corresponds to one of the UL physical layer processing functions included in the set of UL physical layer processing functions, the integrated antenna node comprising:
   a receiver;
   a transmitter;
   a digital interface configured to connect to a digital link for electrically connecting the IAN with a main data processor; and
   one or more processing units, wherein
   said IAN is an asymmetric node which means that said IAN is configured such that: i) as a result of the IAN receiving an UL signal, the IAN performs the UL physical layer processing functions included in said set of UL physical layer processing functions on said received UL signal, but as a result of the IAN receiving a DL signal, the IAN does not perform any of the DL physical layer processing function included in said set of corresponding DL physical layer processing functions on said received DL signal, or ii) as a result of the IAN receiving the DL signal, the IAN performs the DL physical layer processing functions included in said set of corresponding set of DL physical layer processing functions but as a result of the IAN receiving the UL signal, the IAN does not perform any of the UL physical layer processing function included in said set of UL physical layer processing functions.

2. The integrated antenna node as claimed in claim 1, wherein the set of UL processing functions consists of demodulation and the corresponding set of DL processing functions consists of modulation.

3. The integrated antenna node as claimed in claim 1, wherein the uplink physical-layer processing functions comprise one or more of: signal extraction, equalization, demodulation, decoding, medium-access control processing, and radio link control processing.

4. The integrated antenna node as claimed in claim 1, wherein the downlink physical-layer processing functions comprise one or more of: encoding, modulation, beamforming and pre-coding, signal shaping, medium-access control processing, and radio link control processing.

5. The integrated antenna node as claimed in claim 1, wherein the digital interface is an asymmetrical digital interface for exchanging data with the main node.

6. The integrated antenna node as claimed in claim 1, wherein the wireless communication further involves uplink and downlink data link-layer processing, the integrated antenna node being adapted to:
   perform, for at least one set of corresponding uplink and downlink data link-layer processing functions, only the uplink data link-layer processing functions or the corresponding downlink data link-layer processing functions.

7. A method performed by an integrated antenna node (IAN) in a wireless communication system, the wireless communication involving a set of one or more uplink (UL) physical layer processing functions and a set of one or more DL physical layer processing functions corresponding to the set of UL physical layer processing functions, wherein each DL physical layer processing function included in the corresponding set of DL physical layer processing functions corresponds to one of the UL physical layer processing functions included in the set of UL physical layer processing functions, the method comprising:
   the IAN receiving an uplink (UL) signal from a physical antenna;
   the IAN processing the UL signal to produce a processed UL signal, wherein processing the UL signal comprises performing zero or more UL physical layer processing functions on the UL signal;
   the IAN providing the processed UL signal to a main node via an interface connecting the IAN with the main node;
   the IAN receiving a downlink (DL) signal from the main node via the interface connecting the IAN with the main node;
   the IAN processing the DL signal to produce a processed DL signal, wherein processing the DL signal comprises performing a DL physical layer processing functions on the DL signal; and
   the IAN providing the processed DL signal to said physical antenna, wherein
   the IAN is configured such that the IAN does not perform on said UL signal any UL physical layer processing function corresponding to said DL physical layer processing function.

8. The method of claim 7, wherein
   said DL physical layer processing function consists of signal shaping, and
   the IAN is configured such that the IAN does not perform on said UL signal any signal extraction function.

9. The method of claim 7, wherein
   said DL physical layer processing function consists of signal modulation, and
   the IAN is configured such that the IAN does not perform on said UL signal any signal demodulation function.

10. A main node for use in wireless communication in a communication system, the wireless communication involving a set of one or more uplink (UL) physical layer processing functions and a corresponding set of one or more DL physical layer processing functions, wherein each DL physical layer processing function included in the corresponding set of DL physical layer processing functions corresponds to one of the UL physical layer processing functions included in the set of UL physical layer processing functions, the main node comprising:
- a receiver;
- a transmitter;
- a digital interface configured to connect to a digital link for electrically connecting the main node with an integrated antenna node coupled between the main node and a physical antenna; and
- one or more processing units, wherein
- said main node is an asymmetric node which means that said main node is configured such that: i) as a result of the main node receiving an UL signal, the main node performs the UL physical layer processing functions included in said set of UL physical layer processing functions but as a result of the main node receiving a DL signal, the main node does not perform any of the DL physical layer processing function included in said set of corresponding DL physical layer processing functions or ii) as a result of the main node receiving the DL signal, the main node performs the DL physical layer processing functions included in said set of corresponding set of DL physical layer processing functions but as a result of the main node receiving the UL signal, the main node does not perform any of the UL physical layer processing function included in said set of UL physical layer processing functions.

11. The main node as claimed in claim 10, wherein the set of UL processing functions consists of demodulation and the corresponding set of DL processing functions consists of modulation.

12. The main node as claimed in claim 10, wherein the uplink physical-layer processing functions comprise one or more of: signal extraction, equalization, demodulation, decoding, medium-access control processing, and radio link control processing.

13. The main node as claimed in claim 10, wherein the downlink physical-layer processing functions comprise one or more of: encoding, modulation, beam-forming and pre-coding, signal shaping, medium-access control processing, and radio link control processing.

14. The main node as claimed in claim 10, wherein the digital interface is an asymmetrical digital interface for exchanging data with the integrated antenna node.

15. A method performed by a main node in a wireless communication system, the wireless communication involving a set of one or more uplink (UL) physical layer processing functions and a set of one or more DL physical layer processing functions corresponding to the set of UL physical layer processing functions, wherein each DL physical layer processing function included in the corresponding set of DL physical layer processing functions corresponds to one of the UL physical layer processing functions included in the set of UL physical layer processing functions, the method comprising:
- the main node receiving a downlink (DL) signal;
- the main node processing the DL signal to produce a processed DL signal, wherein processing the DL signal comprises performing zero or more DL physical layer processing functions on the DL signal;
- the main node providing the processed DL signal to an integrated antenna node (IAN) via an interface for connecting the main node with the IAN;
- the main node receiving an (UL) signal from the IAN via the interface for connecting the main node with the IAN; and
- the main node processing the UL signal to produce a processed UL signal, wherein processing the UL signal comprises performing an UL physical layer processing functions on the UL signal, wherein
- the main node is configured such that the main node does not perform on said DL signal any DL physical layer processing function corresponding to said UL physical layer processing function.

16. The method of claim 15, wherein
said UL physical layer processing function consists of signal extraction, and
the main node is configured such that the main node does not perform on said DL signal any signal shaping function.

17. The method of claim 15, wherein
said UL physical layer processing function consists of signal demodulation, and
the main node is configured such that the main node does not perform on said DL signal any signal modulation function.

* * * * *

UNITED STATES PATENT AND TRADEMARK OFFICE
CERTIFICATE OF CORRECTION

PATENT NO. : 9,549,436 B2  
APPLICATION NO. : 14/364987  
DATED : January 17, 2017  
INVENTOR(S) : Sundin et al.

Page 1 of 3

It is certified that error appears in the above-identified patent and that said Letters Patent is hereby corrected as shown below:

On the Title Page

In Item (73), under "Assignee", in Column 1, Line 2, delete "ERICCSON" and insert -- ERICSSON --, therefor.

In Item (56), under "U.S. PATENT DOCUMENTS", in Column 2, Line 4, delete "Jones, IV" and insert -- Jones, IV et al. --, therefor.

On Page 2, in Item (56), under "U.S. PATENT DOCUMENTS", in Column 1, Line 1, delete "Kindler" and insert -- Kindler et al. --, therefor.

On Page 2, in Item (56), under "U.S. PATENT DOCUMENTS", in Column 1, Line 3, delete "Kim" and insert -- Kim et al. --, therefor.

On Page 2, in Item (56), under "U.S. PATENT DOCUMENTS", in Column 1, Line 5, delete "Kim" and insert -- Kim et al. --, therefor.

On Page 2, in Item (56), under "U.S. PATENT DOCUMENTS", in Column 1, Line 7, delete "Cyzs" and insert -- Cyzs et al. --, therefor.

On Page 2, in Item (56), under "U.S. PATENT DOCUMENTS", in Column 1, Line 10, delete "Lim" and insert -- Lim et al. --, therefor.

On Page 2, in Item (56), under "U.S. PATENT DOCUMENTS", in Column 1, Line 12, delete "Kang" and insert -- Kang et al. --, therefor.

On Page 2, in Item (56), under "U.S. PATENT DOCUMENTS", in Column 1, Line 14, delete "Olesen" and insert -- Olesen et al. --, therefor.

Signed and Sealed this  
Sixth Day of June, 2017

Michelle K. Lee  
*Director of the United States Patent and Trademark Office*

CERTIFICATE OF CORRECTION (continued)
U.S. Pat. No. 9,549,436 B2

On Page 2, in Item (56), under "U.S. PATENT DOCUMENTS", in Column 1, Line 16, delete "Park" and insert -- Park et al. --, therefor.

On Page 2, in Item (56), under "U.S. PATENT DOCUMENTS", in Column 1, Line 18, delete "Takeuchi" and insert -- Takeuchi et al. --, therefor.

On Page 2, in Item (56), under "U.S. PATENT DOCUMENTS", in Column 2, Line 1, delete "Sucharczuk" and insert -- Sucharczuk et al. --, therefor.

On Page 2, in Item (56), under "U.S. PATENT DOCUMENTS", in Column 2, Line 3, delete "Ibi" and insert -- Ibi et al. --, therefor.

On Page 2, in Item (56), under "U.S. PATENT DOCUMENTS", in Column 2, Line 5, delete "Park" and insert -- Park et al. --, therefor.

On Page 2, in Item (56), under "U.S. PATENT DOCUMENTS", in Column 2, Line 7, delete "Chen" and insert -- Chen et al. --, therefor.

On Page 2, in Item (56), under "U.S. PATENT DOCUMENTS", in Column 2, Line 9, delete "Cyzs" and insert -- Cyzs et al. --, therefor.

In the Specification

In Column 3, Line 14, delete "a eighth" and insert -- an eighth --, therefor.

In Column 3, Line 66, delete "over" and insert -- of --, therefor.

In Column 5, Line 10, delete "beamforming," and insert -- beamforming --, therefor.

In Column 7, Line 39, delete "Squared" and insert -- Square --, therefor.

In Column 10, Lines 3-4, delete "beam-forming and pre-coding" and insert -- beamforming/precoding --, therefor.

In Column 10, Line 28, delete "uplink processing function modules 47" and insert -- uplink processing function modules 48 --, therefor.

In Column 10, Line 41, delete "processing unit 42" and insert -- processing unit 43 --, therefor.

In Column 10, Line 46, delete "transmitter circuitry 43" and insert -- transmitter circuitry 41 --, therefor.

In Column 10, Line 57, delete "which when" and insert -- which, when --, therefor.

In Column 11, Line 10, delete "as also" and insert -- is also --, therefor.

In Column 11, Lines 48-49, delete "beam-forming and pre-coding" and insert -- beamforming/precoding --, therefor.

In Column 12, Lines 5-6, delete "uplink processing function modules 47" and insert -- uplink processing function modules 48 --, therefor.

In Column 12, Line 25, delete "modules 55, 56" and insert -- modules 56, 55 --, therefor.

In Column 12, Line 32, delete "which when" and insert -- which, when --, therefor.

In Column 12, Line 51, delete "as also" and insert -- is also --, therefor.

In the Claims

In Column 14, Lines 5-6, in Claim 4, delete "beam-forming and pre-coding," and insert -- beamforming/precoding, --, therefor.

In Column 15, Line 22, in Claim 10, delete "or ii)" and insert -- or, ii) --, therefor.

In Column 15, Lines 41-42, in Claim 13, delete "beam-forming and pre-coding," and insert -- beamforming/precoding, --, therefor.

In Column 16, Line 20, in Claim 15, delete "(UL)" and insert -- UL --, therefor.